(12) United States Patent
Onozawa et al.

(10) Patent No.: US 7,728,901 B2
(45) Date of Patent: Jun. 1, 2010

(54) SOLID-STATE IMAGING DEVICE USING LIGHT-TRANSMITTING FILM AS A MICRO LENS

(75) Inventors: Kazutoshi Onozawa, Osaka (JP); Motohiro Kojima, Osaka (JP)

(73) Assignee: Panasonic Corporation, Osaka (JP)

( * ) Notice: Subject to any disclaimer, the term of this patent is extended or adjusted under 35 U.S.C. 154(b) by 495 days.

(21) Appl. No.: 11/621,331

(22) Filed: Jan. 9, 2007

(65) Prior Publication Data

US 2007/0200946 A1   Aug. 30, 2007

(30) Foreign Application Priority Data

Feb. 28, 2006  (JP) .............. 2006-053746

(51) Int. Cl.
*H04N 5/225*  (2006.01)
*H04N 5/232*  (2006.01)

(52) U.S. Cl. ............ 348/340; 348/335; 348/345

(58) Field of Classification Search .......... 348/340, 348/272–280, 335, 294; 359/626, 155, 16

See application file for complete search history.

(56) References Cited

U.S. PATENT DOCUMENTS

| | | | | |
|---|---|---|---|---|
| 5,696,371 | A * | 12/1997 | Meyers .............. | 250/208.1 |
| 6,556,349 | B2 * | 4/2003 | Cox et al. ............ | 359/626 |
| 7,002,750 | B2 * | 2/2006 | Lee ................... | 359/626 |
| 2003/0067686 | A1 * | 4/2003 | Shiono et al. ........ | 359/566 |
| 2006/0102827 | A1 | 5/2006 | Kasuga et al. | |
| 2006/0278948 | A1 | 12/2006 | Yamaguchi et al. | |
| 2006/0284052 | A1 | 12/2006 | Toshikiyo et al. | |
| 2007/0035721 | A1 | 2/2007 | Toshikiyo et al. | |
| 2007/0146531 | A1 * | 6/2007 | Toshikiyo .............. | 348/340 |

FOREIGN PATENT DOCUMENTS

| | | |
|---|---|---|
| JP | 9-260624 | 10/1997 |
| JP | 2003-188366 | 7/2003 |
| JP | 2004-526300 | 8/2004 |
| WO | 02/052335 | 7/2002 |
| WO | WO 2005101067 A1 * | 10/2005 |

OTHER PUBLICATIONS

English language abstract JP 9-260624.

(Continued)

*Primary Examiner*—Luong T Nguyen
*Assistant Examiner*—Ahmed A Berhan
(74) *Attorney, Agent, or Firm*—Greenblum & Bernstein, P.L.C.

(57) ABSTRACT

The present invention provides a solid-state imaging device which compensates a field curvature which occurs due to an aberration of the optical imaging system and surely receive light incident with a wide angle. Each pixel (pixel size of 2.2 μm square) in a solid-state imaging device includes a light-transmitting film with the first effective refractive index distribution and a light-transmitting film with the second effective refractive index distribution, a light-receiving element, a wiring, a wavelength selection filter, and a Si substrate. A pixel (1) is a pixel placed an approximate center of the solid-state imaging device. A pixel (n) is a pixel placed in the periphery of the solid-state imaging device, and a pixel (n-x) is a pixel that are placed between the pixel (1) and the pixel (n). The light-transmitting film of each pixel has approximately same effective refractive index distribution. Θ0 which is a main light angle on the light-receiving element side, is approximately same. A main light angle in the optical imaging system is represented as Θ1, Θn-x, and Θn. The light-transmitting film varies for each pixel so that a condition Θ0/Θ1>Θ0/Θn-x<Θ0/Θn.

7 Claims, 11 Drawing Sheets

Angular magnification : Θ0/Θ1<Θ0/Θn-x<Θ0/Θn

OTHER PUBLICATIONS

English language abstract JP 2003-188366.
U.S. Appl. No. 11/571,461 to Kasuga et al., filed Dec. 29, 2006.
U.S. Appl. No. 11/617,173 to Kuriyama, filed Dec. 28, 2006.
U.S. Appl. No. 11/569,603 to Murata et al., filed Nov. 27, 2006.

* cited by examiner

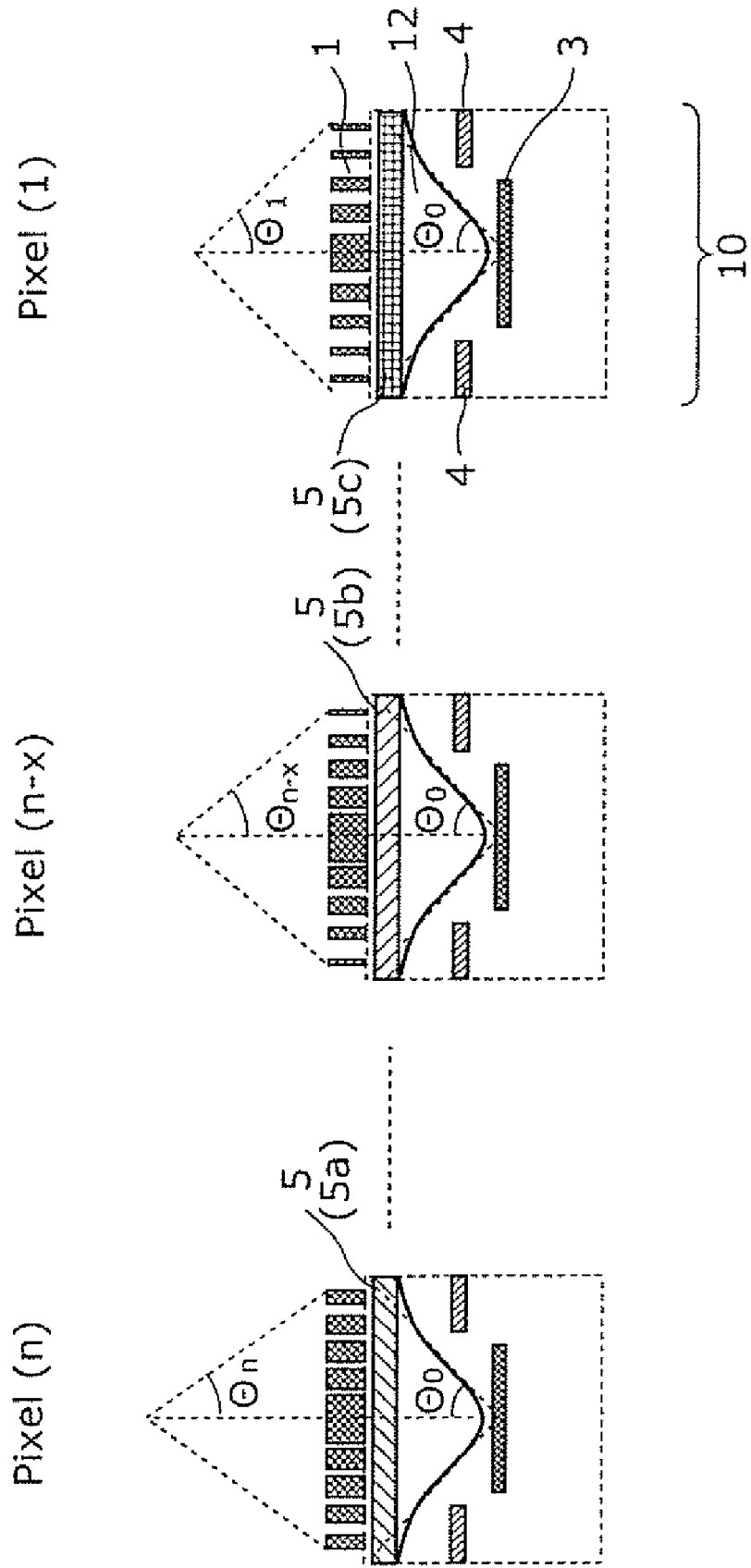

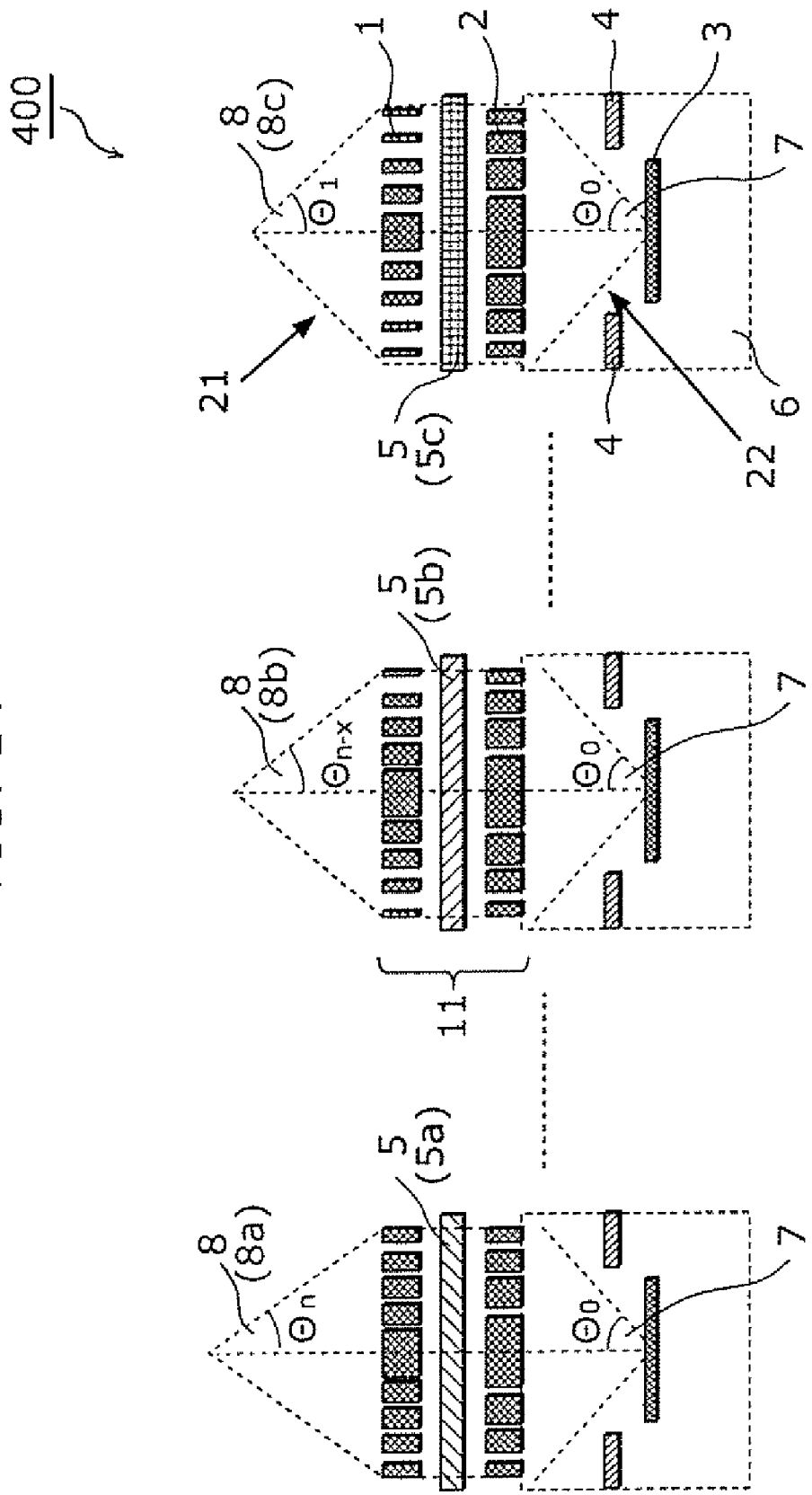

SOLID-STATE IMAGING DEVICE USING LIGHT-TRANSMITTING FILM AS A MICRO LENS

BACKGROUND OF THE INVENTION (1) Field of the Invention

The present invention relates to a solid-state imaging device utilized in digital cameras and the like, and particularly to a solid-state imaging device with a function for correcting a field curvature caused by aberration of an optical imaging system.

(2) Description of the Related Art

Together with the rapid spread of digital still cameras, cell phone cameras and the like, the market for solid-state imaging devices has significantly developed. In addition, along with an increasing demand for thinner digital still cameras and cell phone cameras, miniaturization of camera modules has become a major concern. Miniaturization of the camera modules requires reduction of the number of lenses for an optical system, and thus the focal length of the optical system becomes short. As a result, the reduction of the number of lenses makes it difficult to correct a field curvature caused by an aberration and incident light on a solid-state imaging device has a wide incident angle at the periphery (a wide angle against a vertical axis of an incidence plane of a solid-state imaging device).

On this account, a solid-state imaging apparatus or the like which corrects a field curvature caused by the aberration of an optical imaging system has been proposed (see Japanese Laid-Open Patent Application No. 2003-188366 (Patent Reference 1) and Japanese Translation of PCT International Application laid open as JP2004-526300 (Patent Reference 2)).

The solid-state imaging apparatus according to Patent Reference 1 is configured of thin-filmed solid-state imaging devices which are curved so as to fit a field curvature caused by an aberration of the optical imaging system. With this configuration, even if there is a field curvature caused by an aberration of an optical imaging system, imaging at a high resolution can be performed. In addition, with this configuration, since solid-state imaging devices are curved, an incident angle of light that enters in a solid-state imaging device is compensated.

In addition, in the optical imaging system according to Patent Reference 2, a step is installed for a curved surface corresponding to a field curvature which occurs due to the aberration of the optical imaging system, and microlenses of different focal lengths are set adaptively. With this configuration, it is possible to correct field curvatures. In addition, there is a disclosure of a technology regarding correction of a field curvature. According to this technology, diameter of microlens increases toward the periphery of a solid-state imaging device so as to change the focal length. In this case, light with a wide incident angle can be received relatively well since the diameter of the microlens is wider at the periphery of the solid-state imaging device.

However, with the technology disclosed in aforementioned Patent Reference 1, in the case where solid-state imaging devices are made of thin films or when devices are curved, there is a problem that a pixel defect such as white defect and the like occur due to stress caused by the curve. Furthermore, it is difficult to curve and fix the solid-state imaging devices to correct a field curvature.

In addition, with the manufacturing method for microlenses according to Patent Reference 2, it is difficult to make microlenses of different focal lengths. Note that in Patent Reference 2, the diameter of microlenses set for a solid-state imaging device increases toward the periphery of the solid-state imaging device. However, with this conventional manufacturing method for microlenses, it is difficult to manufacture microlenses of different diameters and of different focal lengths.

SUMMARY OF THE INVENTION

The present invention has been conceived in view of the abovementioned problems. A first object of the present invention is to provide a solid-state imaging device which can correct field curvature caused by an aberration of the optical imaging system and receive light to be incident to the solid-state imaging device with a wide angle. Furthermore, a second object of the present invention is to provide a solid-state imaging device which can prevent color aberration which causes different imaging positions depending on wavelengths.

To solve the abovementioned problems, the solid-state imaging device according to the present invention includes unit pixels, in which each of the unit pixels has a light-collecting unit for collecting incident light from an optical imaging system, and a focal length or an angular magnification of the light-collecting unit varies from unit pixel to unit pixel so that an aberration of the optical imaging system is corrected.

With this configuration, even if there is a field curvature caused by the aberration of the optical imaging system, the field curvature can be compensated, and thus imaging can be performed at a high resolution.

Furthermore, the further unit pixel is located from the center of the solid-state imaging device, the longer a focal length of the light collecting unit becomes.

In addition, the further unit pixel is located from the center of the solid-state imaging device, the larger an angular magnification of the light collecting unit becomes.

In addition, the light-collecting unit may include at least a light-transmitting film with a first effective refractive index distribution and a light-transmitting film with a second effective refractive index distribution.

In addition, the light-transmitting film with the first effective refractive index distribution may have an effective refractive index distribution which is determined by a light-transmitting film partially forming the light-transmitting film.

In addition, the focal point of the light-transmitting film with the second effective refractive index distribution is constant on a surface of the solid-state imaging device.

Thus, a focal length of light-collecting unit can be increased from the center to the periphery of the region in which unit pixels are formed. Therefore, even if there is a field curvature caused by an aberration of the optical imaging system, the field curvature can be compensated, and imaging can be performed at a high resolution.

Furthermore, the effective refractive index distribution is asymmetric to the center of the unit pixel.

Thus, by displacing the center of the effective refractive index distribution of the unit pixels located in the periphery of the region which is formed by the unit pixels, it is possible to receive incident light that enters in the solid-state imaging device with a wide angle can be received. In addition, even if there is a field curvature caused by the aberration of the optical imaging system, the field curvature can be compensated and imaging can be performed at a high resolution.

Furthermore, the light-collecting unit further includes a light-transmitting film with a third effective refractive index distribution between the light-transmitting film with the first effective refractive index distribution and the light-transmitting film with the second effective refractive index distribution.

Thus, even if there is a field curvature caused by the aberration of the optical imaging system, the field curvature is corrected and imaging can be performed at a high resolution. In addition, the third effective refractive index distribution performs a role as a relay lens, and thus light collection is assured.

Furthermore, the unit pixel further includes a wavelength selection filter which selects a light of predetermined wavelength, and the light-collecting unit has an effective refractive index distribution adapted to the light selected by the wavelength selection filter.

In addition, the wavelength selection filter is placed between the light-transmitting film with the first effective refractive index distribution and the light-transmitting film with the second effective refractive index distribution.

Thus, even if there is a difference in field curvatures or chromatic aberrations due to wavelength bandwidth in the optical imaging system, field curvatures are compensated and imaging at a high resolution can be performed.

Furthermore, the present invention can also be realized as a camera with a solid-state imaging device.

The solid-state imaging device according to the present invention can compensate field curvatures and perform imaging at a high resolution even if there is a field curvature caused by the aberration of the optical imaging system. In addition, it is assured that incident light with a wide-angle to the solid-state imaging device is received.

FURTHER INFORMATION ABOUT TECHNICAL BACKGROUND TO THIS APPLICATION

The disclosure of Japanese Patent Application No. 2006-053746 filed on Feb. 28, 2006 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 8 is a diagram showing an embodiment in which an inner layer lens made of refractive index material [SiN (n=1.95)] is used as the light-transmitting film with the second effective refractive index distribution according to the first embodiment;

FIG. 14 is a diagram showing a cross-section structure of a solid-state imaging apparatus according to a fourth embodiment.

DESCRIPTION OF THE PREFERRED EMBODIMENT(S)

The embodiments of the present invention are described herein with reference to the diagrams. Although the present invention will be described based on the embodiments and the accompanying diagrams, it is not intended to limit the scope of the present invention.

First Embodiment

Figure 1:
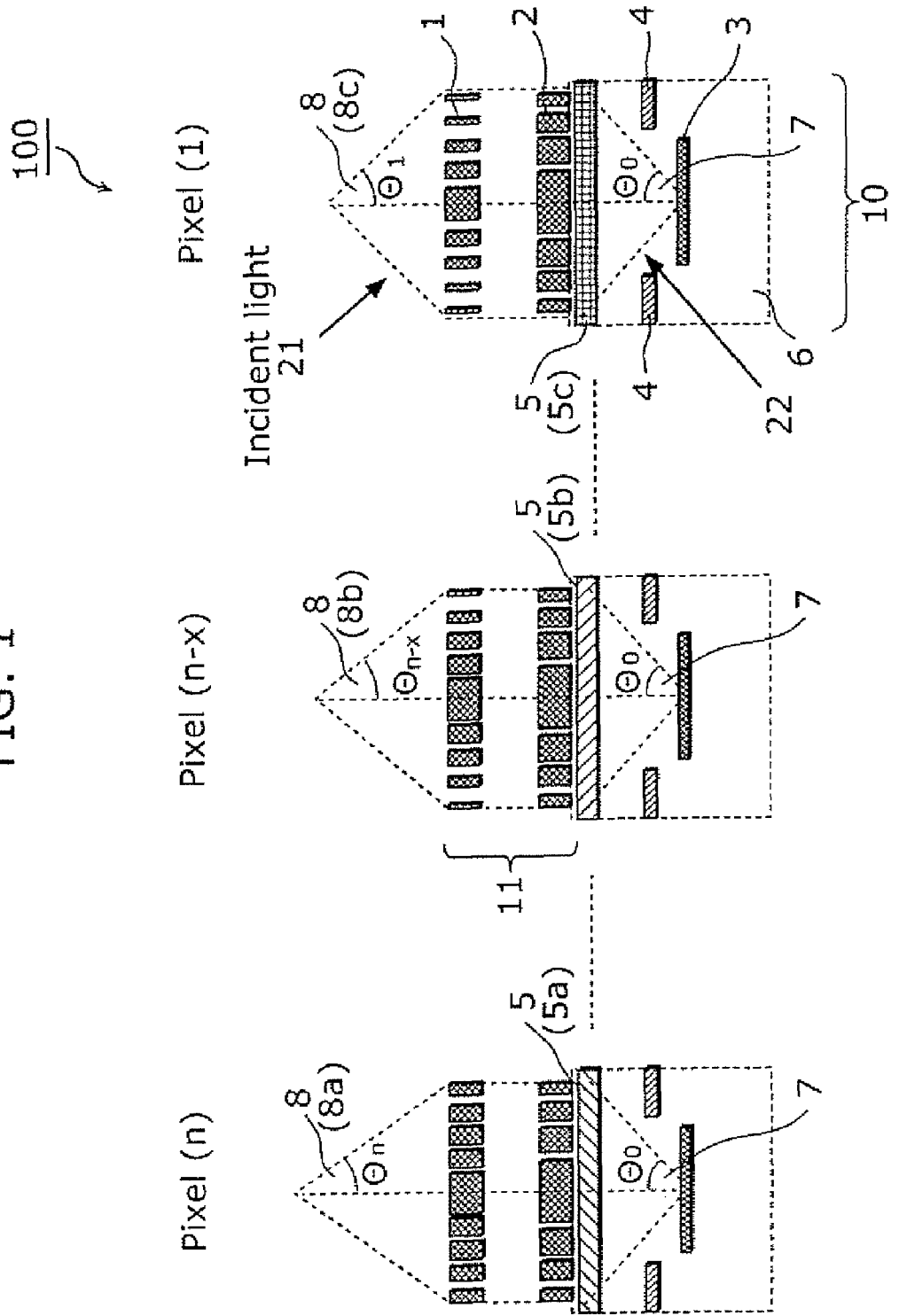
FIG. 1 is a diagram showing a cross section structure of a solid-state imaging device according to a first embodiment.

FIG. 1 is a diagram showing a cross section overview of a solid-state imaging device according to this embodiment. A solid-state imaging device 100 is an imaging device used for digital still cameras and cell phone cameras, and unit pixels (pixel size 2.2 µm square and a unit pixel, also referred to as "pixel") are set in two dimensions. Each unit pixel includes a light-transmitting film 1 with the first effective refractive index distribution, a light-transmitting film 2 with the second effective refractive index distribution, a light-receiving element (a Si photodiode) 3, a wiring 4, a wavelength selection filter (color filter) 5, and a Si substrate 6.

Figure 2:
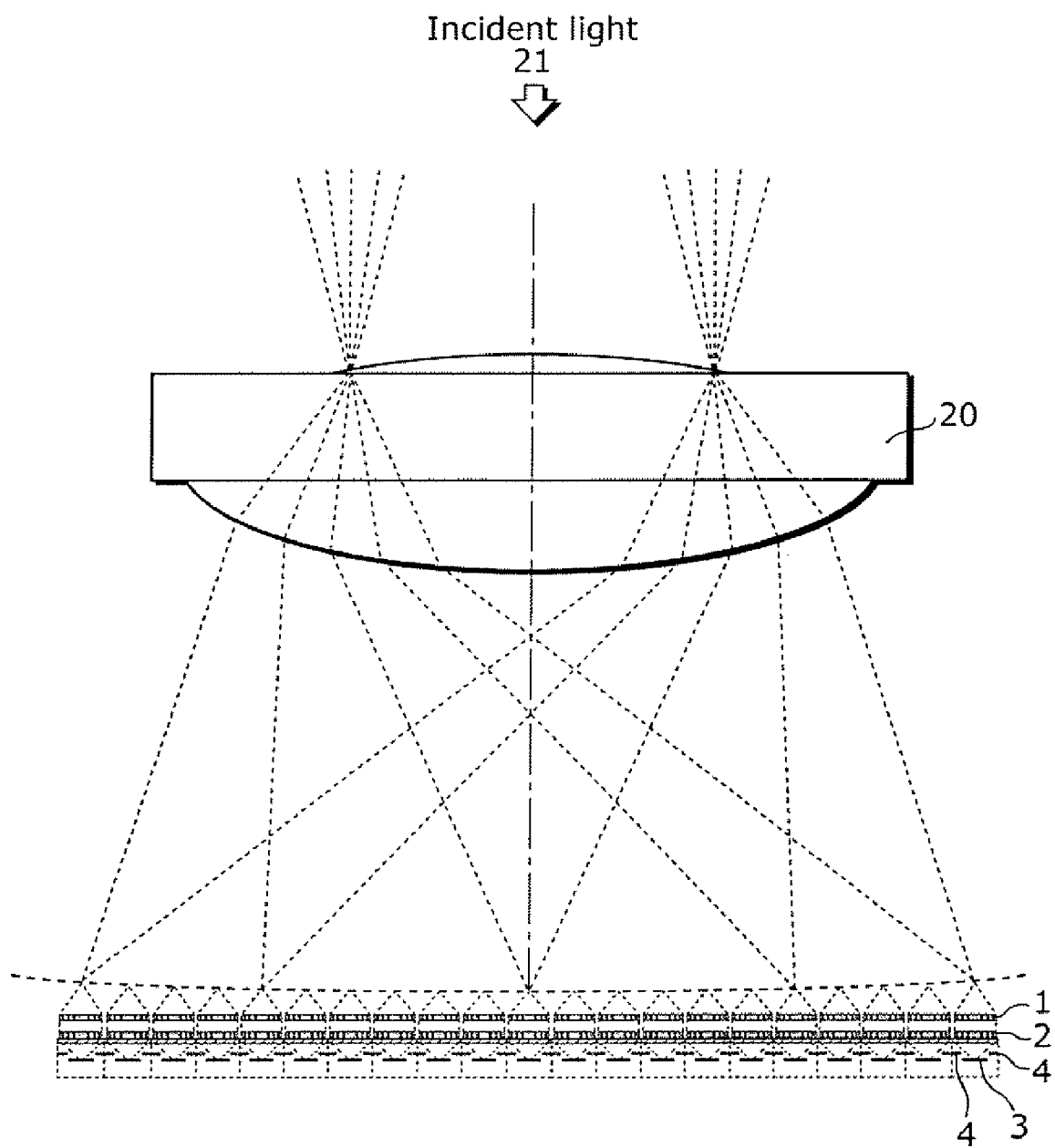
FIG. 2 is a diagram showing a brief overview of a solid-state imaging device and an optical imaging system according to the first embodiment.

A pixel (1) shown in FIG. 1 is a unit pixel placed in the approximate center of the solid-state imaging device 100, and includes a wavelength selection filter 5c. A pixel (n) is a unit pixel set in the periphery of the solid-state imaging device 100, and includes a wavelength selection filter 5a. It is noted that a pixel (n-x) is a unit pixel set between the pixel (1) and the pixel (n), and includes a wavelength selection filter 5b. A light-transmitting film 2 with the second effective refractive index distribution that is set for each unit pixel has an approximately same effective refractive index distribution for each wavelength range in which light is to be collected, and $\Theta_0$, which is a main-beam angle on the light-receiving element 3 (main light angle on the image side) is approximately same. A main-beam angle on the optical imaging system 8 (the main light angle on the object side) is expressed as $\Theta_1$, $\Theta_{n-x}$ or $\Theta_n$ for each pixel. The first effective refractive index distribution varies for each pixel so as to satisfy $\Theta_0/\Theta_1 < \Theta_0/\Theta_{n-x} < \Theta_0/\Theta_n$ FIG. 2 is a diagram showing an overview of the solid-state imaging device 100 and an optical imaging system according to the first embodiment. As described in the diagram, the light-transmitting film 1 with the first effective refractive index distribution and the light-transmitting film 2 with the second effective refractive index distribution are set so that the focal lengths increase from the center to the periphery of the solid-state imaging device 100 to correct an aberration of field curvature of an optical imaging system (an imaging lens 20), or so that an angular magnification (a ratio of a main light angle on the image side and a main light angle on the object side) increases. With this configuration, even if there is a field curvature caused by an aberration of the optical imaging system, the field curvature is compensated and thus imaging can be performed at a high resolution. In addition, in the solid-state imaging device 100, the first effective refractive index distribution and the second effective refractive index distribution are designed in accordance with R (red), G (green), and B (blue) which are wavelengths selected in the wavelength selection filters 5.

Figure 3:
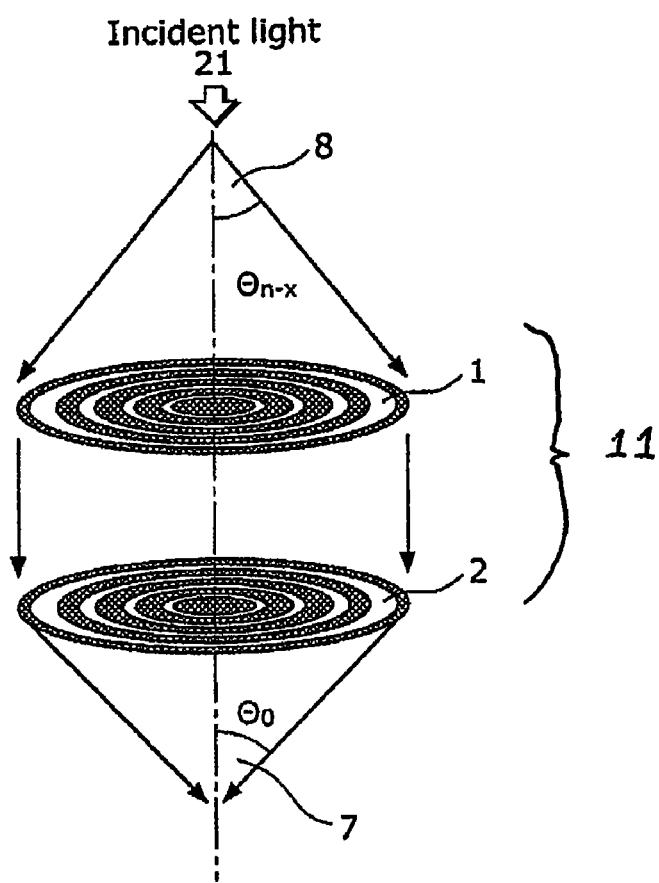
FIG. 3 is a diagram showing a brief overview of a light-transmitting film with the first effective refractive index distribution, a light-transmitting film with the second effective refractive index distribution, and light-collecting element on the solid-state imaging device configured of the light-transmitting films.
Figure 4:
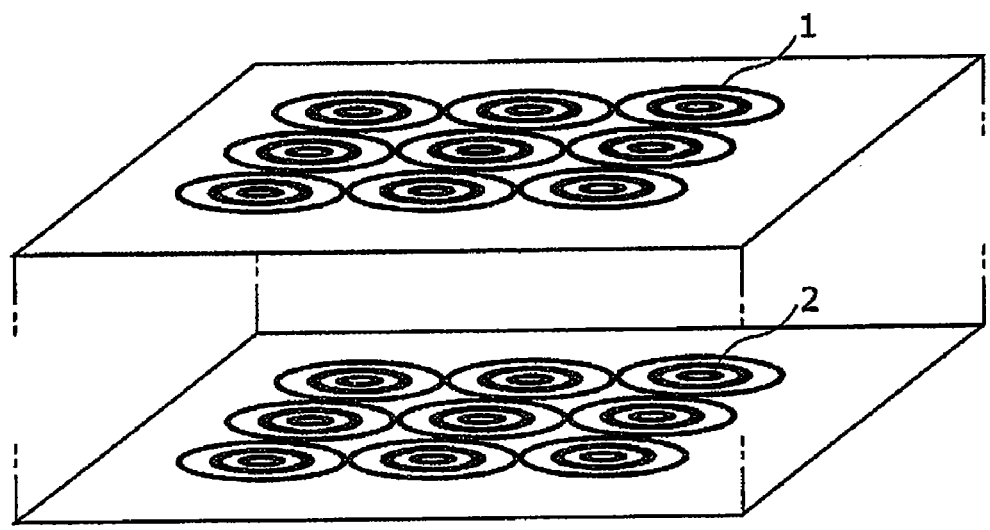
FIG. 4 is a diagram showing how a light-collecting element according to the first embodiment is arranged in two dimensions.

FIG. 3 shows an overview of the light-transmitting film 1 with the first effective refractive index distribution and the light-transmitting film 2 with the second effective refractive index distribution, and a light-collecting element 11 in the solid-state imaging device 100 which is configured of the light-transmitting films. In addition, FIG. 4 is a diagram showing that the light-collecting elements 11 are set in two dimensions.

Figure 5:
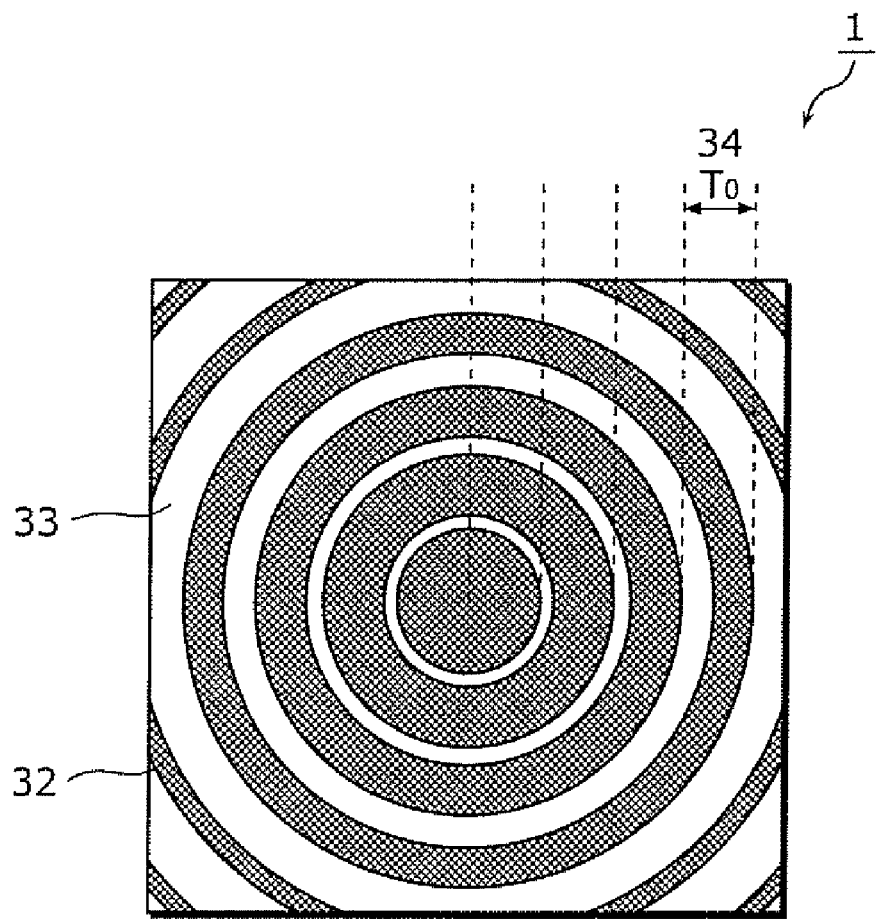
FIG. 5 is a top plan view of light-transmitting film with the first effective refractive index distribution according to the first embodiment.

FIG. 5 is a diagram showing a top plan view of the light-transmitting film 1 with the first effective refractive index distribution. The light-transmitting film 1 with the first effective refractive index distribution shown in a concentric circular structure in FIG. 5, is configured of a high refractive index material 32 [for example, $SiO_2$ (n=1.45)] and a low refractive index material 33 [for example, air (n=1.0), and outer radius difference ($T_0$) 34 between adjacent circular structure of high refractive index materials 32 is 200 nm. Note that the film is 1.2 μm thick.

Figure 6:
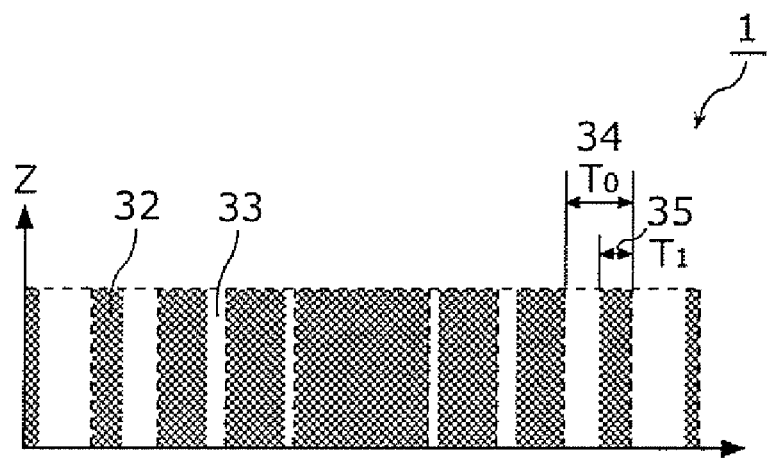
FIG. 6 is a diagram showing a cross section structure of light-transmitting film with the first effective refractive index distribution according to the first embodiment.

FIG. 6 is a diagram showing a cross section structure of the light-transmitting film 1 with the first effective refractive index distribution. In FIG. 6, a width 35 of a given high refractive index material 32 in the light-transmitting film 1 with the first effective refractive index distribution is shown as $T_1$. The width 35 of the high refractive index material 32 in a concentric circular structure is widest in the center of the concentric rings, and the width, $T_1$, gradually decreases toward the outer rings. When the circular structure of the light-transmitting film 1 (that is, outer radius difference 34 between the adjacent high refractive index materials 32) is equal to or smaller than the wavelength of incident light 21, effective refractive index of light can be calculated by a volume ratio of the high refractive index material 32 and a low refractive index material 33. This structure is best characterized in that the effective refractive index distribution can be freely controlled by simply changing the width 35.

Figure 7A:
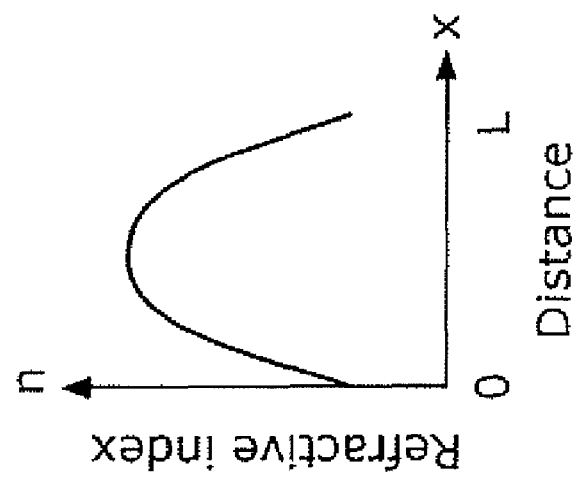
FIGS. 7A to 7C are diagrams, each of which shows the first effective refractive index distribution according to the first embodiment.
Figure 7B:
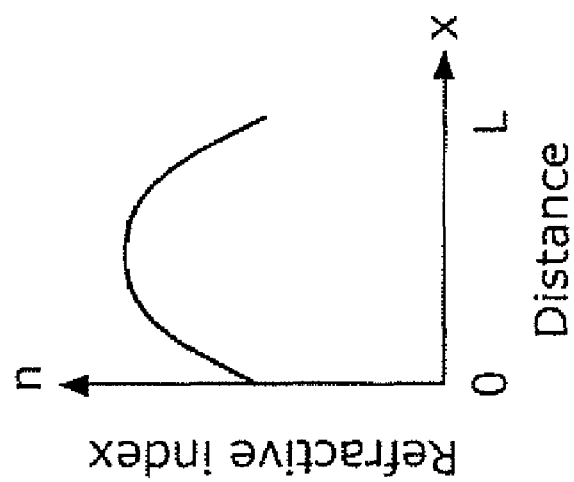
Figure 7C:
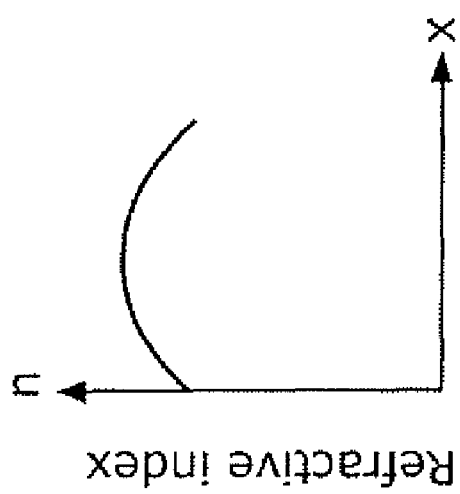

FIGS. 7A to 7C are diagrams respectively showing the first effective refractive index distribution. FIG. 7C shows the first effective refractive index distribution of the pixel (1) placed in the approximate center of the solid-state imaging device 100. FIG. 7A shows the first effective refractive index distribution of the pixel (n) placed in the periphery of the solid-state imaging device 100. FIG. 7B shows the first effective refractive index distribution of the pixel (n-x) placed between the pixel (1) and the pixel (n).

In the approximate center of the solid-state imaging device 100, an effective refractive index significantly varies as shown in FIG. 7C, and the first effective refractive index distribution is determined based on a short focus design. In addition, in the periphery of the solid-state imaging device 100, a change in effective refractive index is small as shown in FIG. 7A, and the first effective refractive index distribution is performed based on a long focus design. The structure of the light-transmitting film 1 with the first effective refractive index distribution is designed in accordance with a field curvature.

When a circular structure of the light-transmitting film is equal to, or smaller than the wavelength of the incident light 21, effective refractive index of the light $n_{eff}$, can be expressed as $$n_{eff} = [W \cdot n_h + (a-W)n_l]/a \qquad (1)$$

Here, W is the width 35 of concentric circles, "a" is the outer radius difference 34 between the adjacent high refractive index materials 32 (also referred to as "pitch"), and $n_h$ and $n_l$ are respective refractive indexes of the high refractive index materials 32 and the low refractive index materials 33.

The first effective refractive index distribution has a parabolic refractive index distribution in which the center of a pixel has the highest refractive index and the effective refractive index becomes lower toward the edge. The following equation (2) shows an effective refractive index distribution to collect the incident light 21 of a wavelength λ at a focal length f.

$$\Delta n(x) = \Delta n_{max}[Ax^2/2\pi + C] \ (A, C: \text{constant}) \qquad (2)$$

Here, $\Delta n_{max}$ is an effective refractive index difference (0.45 in this embodiment) between a medium on the incidence side and a lens material. In addition, the equation (2) can set a parameter when an effective refractive index of medium on the incidence side is $n_0$, and an effective refractive index of medium on the emitting side is $n_1$, $$A = -(k_0 n_1)/2f \qquad (3)$$

$$K_0 = 2\pi/\lambda \qquad (4)$$

Thus, it is possible to optimize a lens for any aimed focal length and wavelength. Note that in the equation (2), an item defined by a quadratic function of distance x from the center of a pixel indicates a light condensing element.

As is evident from above, the light-collecting element 11 of the present invention is best characterized in that a focus can be freely determined by simply changing W, which is the width 35, and thus it is possible to realize an effective refractive index distribution lens adapted to light with a particular wavelength.

Here, in the case where the pitch (a), which is a radius difference 34, is 200 nm, the film is 1.2 μm thick, and the focal length f is 4.3 μm, the smallest width W when the incident wavelength is 0.45 μm (blue) is approximately 60 nm. Note that the smallest width W when the incident wavelength is 0.55 μm (green) or 0.65 μm (red) is approximately 75 nm and approximately 90 nm, respectively.

Furthermore, the light-transmitting film 2 with the second effective refractive index distribution is configured of a high refractive index material 32 [SiN (n=1.95)]] and a low refractive index material 33 [$SiO_2$ (n=1.45)] of a concentric circle structure; the radius difference 34 between the adjacent high refractive index materials 32 is 200 nm. Note that a film is 1.2 μm thick. The light-transmitting film 2 with the second effective refractive index distribution placed in each pixel is designed to have approximately same effective refractive index distribution for each incident wavelength of RGB.

Figure 9:
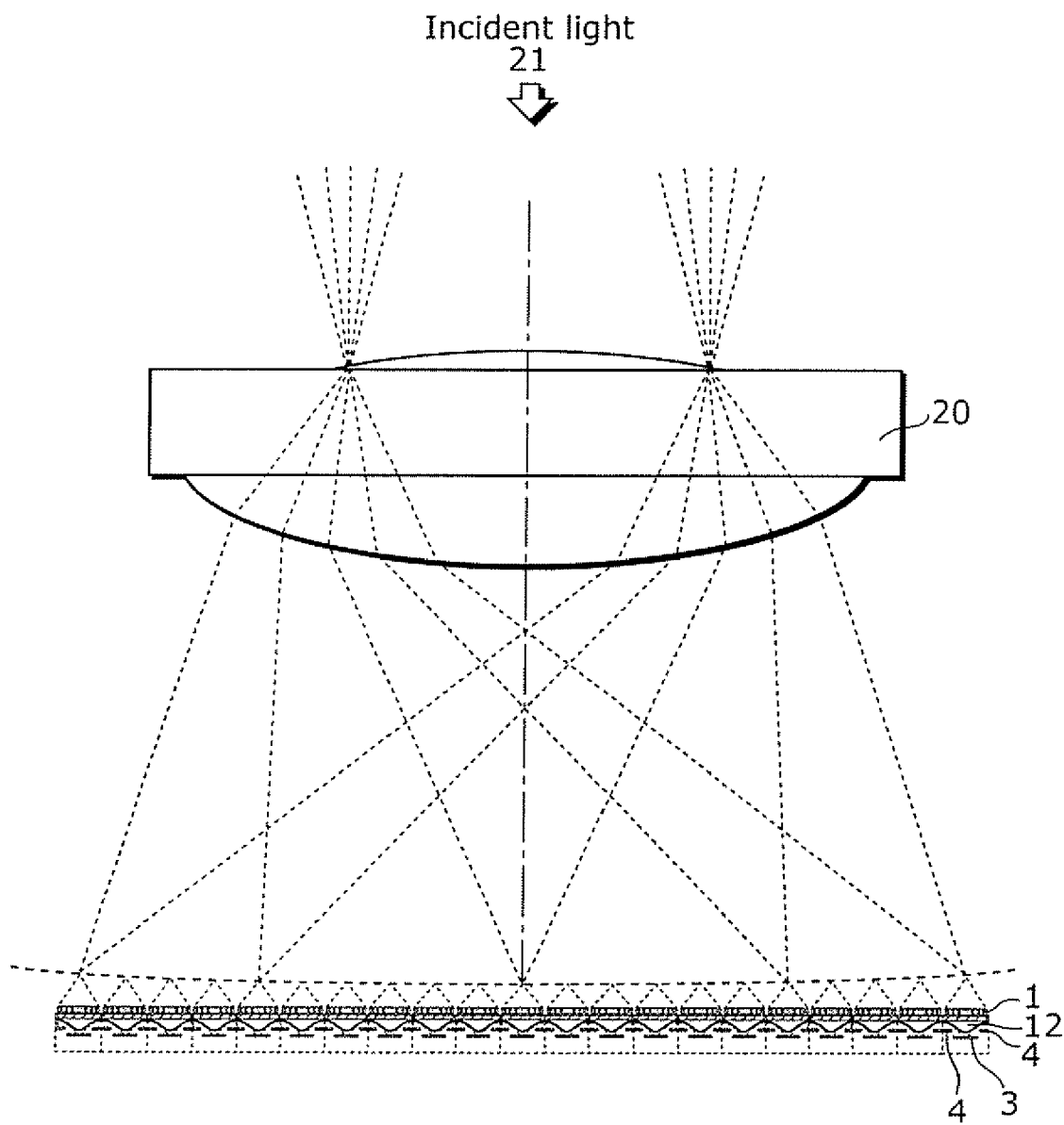
FIG. 9 is a diagram showing an overview of a solid-state imaging device and an optical imaging system in the case where a inner layer lens is used as the light-transmitting film with the second effective refractive index distribution according to the first embodiment.

In addition, the second effective refractive index distribution may be realized as an inner layer lens 12 as shown in FIG. 8 using a refractive index material 36 [Si N (n=1.95)]. In this case, lenses with the approximately same refractive index distribution are used. FIG. 9 is a diagram showing an overview of the solid-state imaging device 100 and an optical imaging system in the case where the inner layer lens 12 is used. As shown in the diagram, by setting the light-transmitting film 1 with the first effective refractive index distribution and the inner layer lens 12 with the second effective refractive index distribution so that the focal length becomes longer and the angular magnification becomes larger from the center to the periphery of the solid-state imaging device 100. Thus, even if there is a field curvature caused by an aberration of the optical imaging system, the field curvature is compensated and imaging can be performed at a high resolution.

As described above, even if there is a field curvature caused by the aberration of the optical imaging system, the solid-state imaging device according to the present invention can compensate field curvatures and imaging can be performed at a high resolution by setting the light-transmitting film with the first effective refractive index distribution and either the light-transmitting film with the second effective refractive distribution index or the inner layer lens.

Second Embodiment

A solid-state imaging device compliant with the incident light 21 that enters with a wider angle is described in this embodiment.

Figure 10:
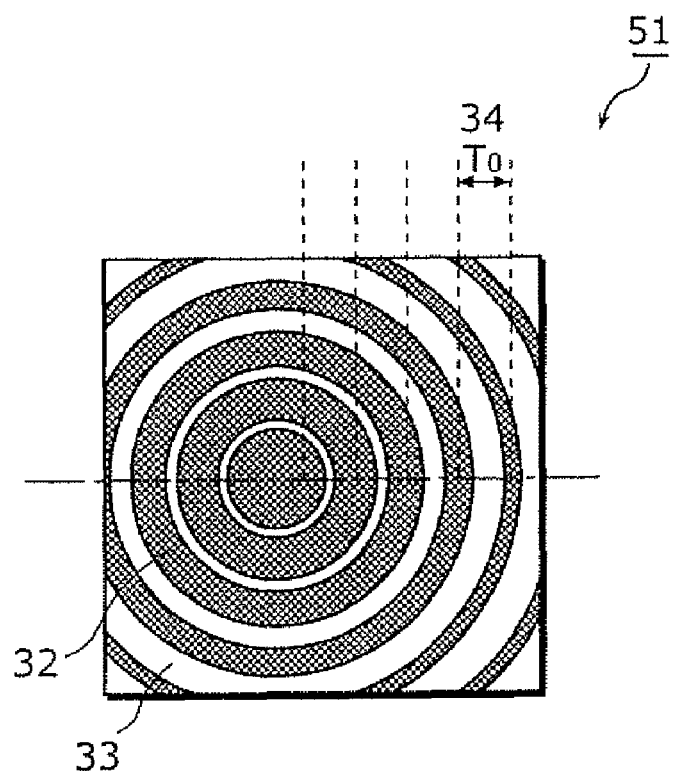
FIG. 10 is a diagram showing a top plan view of a light-transmitting film with the first effective refractive index distribution according to a second embodiment.
Figure 11:
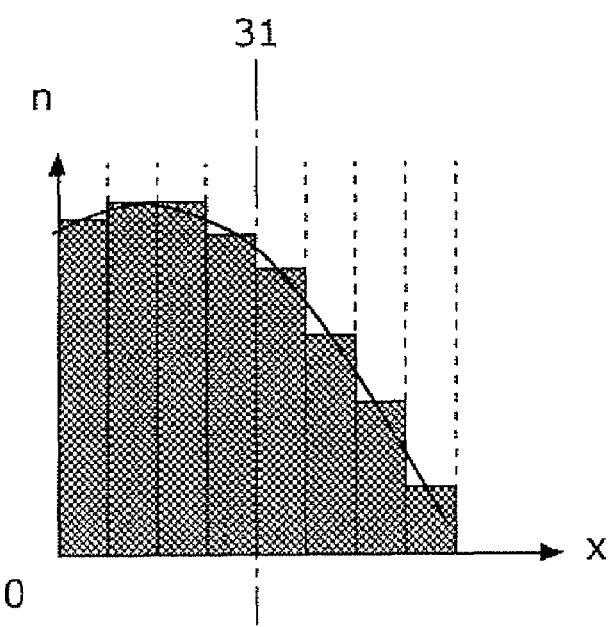
FIG. 11 is a diagram showing effective refractive index distribution of a light-transmitting film with the first effective refractive index distribution according to the second embodiment.
Figure 12:
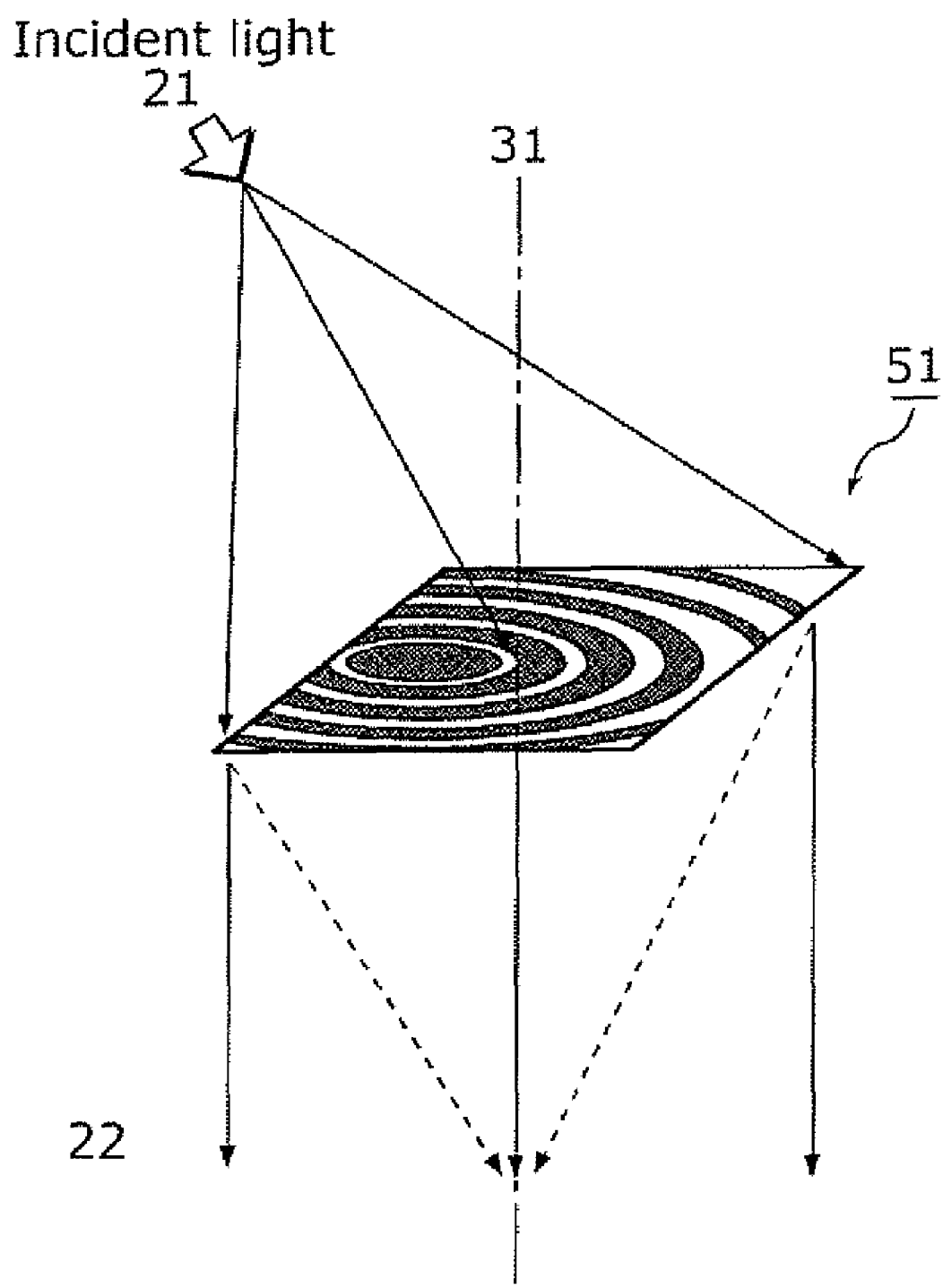
FIG. 12 is a diagram showing a bias incidence property in a solid-state imaging device according to the second embodiment.

FIG. 10 is a diagram showing a top plan view of a light-transmitting film 51 with the first effective refractive index distribution. The light-transmitting film 51 in a concentric circle structure with the first effective refractive index distribution, is configured of a high refractive index material 32 [for example, $SiO_2$ (n=1.45)] and a low refractive index material 33 [for example, air (n=1.0)$_1$ and outer radius difference ($T_0$) 34 of adjacent high refractive materials 32 is 200 nm. Note that the film is 1.2 µm thick. A change in effective refractive index in this case is shown in FIG. 11, and is asymmetric to the center of a pixel. The effective refractive index of a lens is highest in the center of the circle, and gradually decreases toward the edge. Thus the lens can change a direction of incident light enters from a diagonal direction (a wide angle) such as the incident light 21 shown in FIG. 12.

The first effective refractive index distribution in this case can be expressed as an equation (5) shown below.

$$\Delta n(x) = \Delta n_{max}[Ax^2 + Bx \sin \Theta / 2\pi + C] \quad (5)$$

(A, B, C: constant)

Here, $\Delta n_{max}$ is an effective refractive index difference (0.45 in this embodiment) between a medium on the incidence side and a lens material. In addition, the equation (5) above can set a parameter when an effective refractive index of the medium on the incidence side is $n_0$, and an effective refractive index of medium on the emitting side is $n_1$.

$$A = -(k_0 n_1)/2f \quad (6)$$

$$B = -k_0 n_0 \quad (7)$$

$$K_0 = 2\pi/\lambda \quad (8)$$

Thus, it is possible to design a lens that is optimal for any aimed focal length and wavelength. Note that in the equation (5), an item defined by a quadratic function of distance x from the center of a pixel indicates a light condensing component, and an item defined by a product of x and a trigonometric function indicates deflection component.

Here, a parabola expressed by the equation (5) is continuous, and is an ideal refractive index distribution. However, in actual micro-optical systems (sub-micron regions), it is extremely difficult to form a continuous distribution. In the present invention, similar effect is obtained by digitizing the effective refractive index distribution of the abovementioned lens in the ranges that are less than a half of wavelength of incident light.

In the light-transmitting film 51 with the first effective refractive index distribution according to the first embodiment, it is possible to optimize lens structure for each pixel adapted to the wavelength of the incident light 21. Thus there is no difference light-collecting efficiency caused by incident angles, and highly efficient light-collection can be performed. Whereas the center of a concentric circle is in the center of a pixel in the effective refractive index distribution for 0 degree incident light, the center shifts toward the incidence side of light as the incident angle increases.

This is due to a shift of a maximum value of a quadratic curve indicating an effective refractive index distribution to the incident light side. Here, the concentric circle structure of a lens becomes asymmetric toward the center of a pixel (see abovementioned FIG. 11).

For example, when a pixel size is 2.2 µm square and focal length f of the light-collecting element 11 is 4.3 µm, a incident light with a incidence angle of 30 degrees enters a pixel which is 800 pixels apart from the center pixel, the center of the concentric circles shifts to the center by 1.4 µm.

In addition, as is evident from the relations between the parameters A, B, $k_0$ in the equation (5) above, phase modulation differs according to a wavelength of object light. In other words, optimal lens structure is selected according to a color (wavelength) of incident light to each pixel. In the second embodiment, when the wavelength of light is 0.45 µm, 0.55 µm, and 0.65 µm respectively enters a unit pixel with a lens structure for each color, each pixel shows high light-collecting efficiency.

As described above, the solid-state imaging device according to the present invention can compensate field curvatures and imaging can be performed at a high resolution by setting a light-transmitting film with a first effective refractive index distribution and either a light-transmitting film with the second effective refractive distribution index or a inner layer lens, even if there is a field curvature caused by an aberration of the optical imaging system.

Third Embodiment

Figure 13:
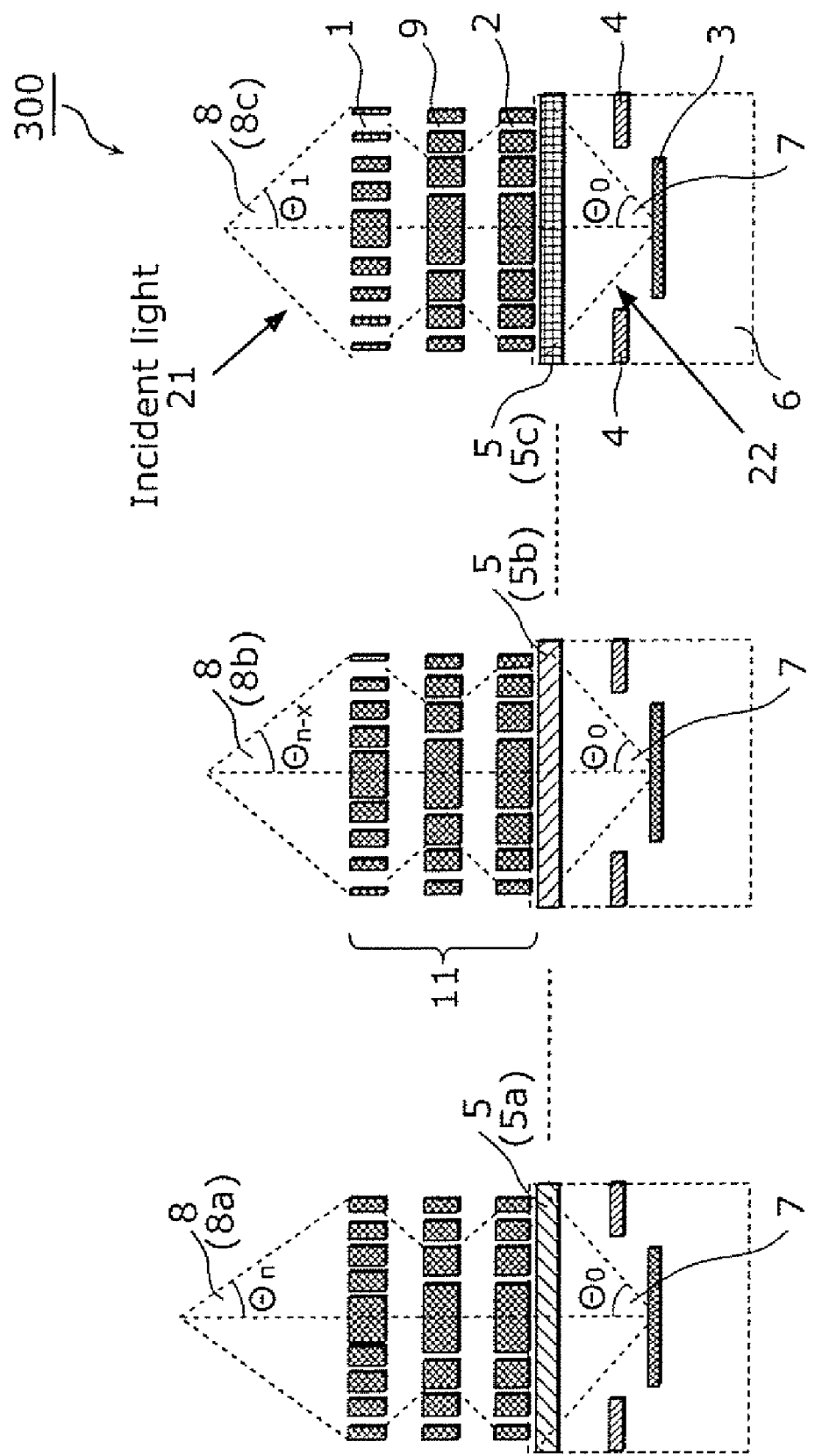
FIG. 13 is a diagram showing a cross-section structure of a solid-state imaging device according to a third embodiment.

FIG. 13 is a diagram showing a cross section overview of a solid-state imaging device 300 according to this embodiment. Each unit pixel (pixel size 2.2 µm square) includes a light-transmitting film 1 with the first effective refractive index distribution, a light-transmitting film 2 with the second effective refractive index distribution, a light-transmitting film 9 with the third effective refractive index distribution, a light-receiving element (a Si photodiode) 3, a wiring 4, a wavelength selection filter (color filter) 5, and a Si substrate 6.

For example, the pixel (1) is a unit pixel placed in the approximate center of the solid-state imaging device 300. A pixel (n) is a unit pixel placed in the periphery of the solid-state imaging device 300. It is noted that a pixel (n-x) is a unit pixel placed between the pixel (1) and the pixel (n). A light-transmitting film 2 with the second effective refractive index distribution installed for each unit pixel has an approximately same refractive index distribution for each wavelength range in which light is to be collected, and $\Theta_0$, which is a main light angle (on the image side) is approximately same. Main light angle on the optical imaging system 8 (a main light angle on the object side) is expressed as $\Theta_1$, $\Theta_{n-x}$ or $\Theta_n$ for each pixel. The first effective refractive index distribution differs for each pixel so as to satisfy $\Theta_0/\Theta_1 < \Theta_0/\Theta_{n-x} < \Theta_0/\Theta_n$. Furthermore, the light-transmitting film 9 with the third effective refractive index distribution is configured between the light-transmitting film 1 with the first effective refractive index distribution and the light-transmitting film 2 with the second effective refractive index distribution, and performs as a relay lens. With this configuration, light collection can be assured. Even if there is a field curvature caused by an aberration of the optical imaging system, the field curvature can be compensated and imaging can be performed at a high resolution.

Fourth Embodiment

FIG. 14 is a diagram showing a cross section overview of a solid-state imaging device according to this embodiment. Each unit pixel (pixel size 2.2 μm square) includes a light-transmitting film 1 with the first effective refractive index distribution, a light-transmitting film 2 with the second effective refractive index distribution, a light-receiving element (a Si photodiode) 3, a wiring 4, a wavelength selection filter (color filter) 5, and a Si substrate 6.

The pixel (1) is a unit pixel placed in the approximate center of the solid-state imaging device 400. A pixel (n) is a unit pixel placed in the periphery of the solid-state imaging device 400. A pixel (n-x) is a unit pixel placed between the pixel (1) and the pixel (n). A light-transmitting film 2 with the second effective refractive index distribution installed for each unit pixel has an approximately same refractive index distribution for each wavelength range in which light is to be collected. $\Theta_0$, which is a main light angle 7 on the light-receiving element 3 (on the image side) is approximately same. A main light angle 8 on the optical imaging system (on the object side) is expressed as $\Theta_1$, $\Theta_{n-x}$ or $\Theta_n$ for each pixel. The first effective refractive index distribution differs for each pixel so as to satisfy $\Theta_0/\Theta_1 < \Theta_0/\Theta_{n-x} < \Theta_0/\Theta_n$. Furthermore, the pixel includes a wavelength selection filter 5 between the light-transmitting film 1 with the first effective refractive index distribution and the light-transmitting film 2 with the second effective refractive index distribution. Thus, even if there is a field curvature or chromatic aberration caused by the wavelength bandwidth of the optical imaging system, the field curvature and the chromatic aberration can be corrected and imaging can be performed at a high resolution. Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The solid-state imaging device according to the present invention can be utilized for apparatuses provided with a function for imaging, such as digital video cameras, digital still cameras, and cell phone cameras, and is useful for the industry.

What is claimed is:

1. A solid-state imaging device comprising a plurality of unit pixels,
   wherein each of said unit pixels includes a light-collecting unit operable to collect incident light from an optical imaging system and a wavelength selection filter which selects a light of predetermined wavelength,
   wherein said light-collecting unit includes a first refractive index distribution and a second refractive index distribution and a refractive index distribution adapted to the light selected by said wavelength selection filter,
   wherein the first refractive index distribution has an effective refractive index distribution forming a concentric circular structure of a first light-transmitting film,
   wherein said wavelength selection filter is placed between the first light-transmitting film with the first refractive index distribution and a second light-transmitting film with the second refractive index distribution,
   wherein the width of the first light-transmitting film is equal to or smaller than a wavelength of incident light, and
   wherein a focal length or an angular magnification of said light-collecting unit varies from unit pixel to adjacent unit pixel so that an aberration of the optical imaging system is corrected.

2. The solid-state imaging device according to claim 1, wherein the further said adjacent unit pixel is located from the center of the solid-state imaging device, the longer a focal length of said light-collecting unit becomes.

3. The solid-state imaging device according to claim 1, wherein the further said adjacent unit pixel is located from the center of the solid-state imaging device, the larger a angular magnification of said light-collecting unit becomes.

4. The solid-state imaging device according to claim 1, wherein the effective refractive index distribution is asymmetric to the center of said adjacent unit pixel.

5. The solid-state imaging device according to claim 1, wherein the focal point of the light-transmitting film with the second refractive index distribution is constant on a surface of the solid-state imaging device.

6. The solid-state imaging device according to claim 1, wherein said light-collecting unit further includes a light-transmitting film with a third refractive index distribution between the light-transmitting film with the first refractive index distribution and the light-transmitting film with the second refractive index distribution.

7. A camera comprising a solid-state imaging device in which a plurality of unit pixels are placed,
   wherein each of said unit pixels includes a light-collecting unit operable to collect incident light from an optical imaging system and a wavelength selection filter which selects a light of predetermined wavelength,
   wherein said light-collecting unit includes a first refractive index distribution and a second refractive index distribution and a refractive index distribution adapted to the light selected by said wavelength selection filter,
   wherein the first refractive index distribution has an effective refractive index distribution forming a concentric circular structure of a first light-transmitting film,
   wherein said wavelength selection filter is placed between the first light-transmitting film with the first refractive index distribution and a second light-transmitting film with the second refractive index distribution,
   wherein the width of the first light-transmitting film is equal to or smaller than a wavelength of incident light, and
   wherein a focal length or an angular magnification of said light-collecting unit varies from unit pixel to adjacent unit pixel so that an aberration of the optical imaging system is corrected.

* * * * *